(12) United States Patent
Wada

(10) Patent No.: US 8,465,094 B2
(45) Date of Patent: Jun. 18, 2013

(54) OPERATOR SEAT STRUCTURE OF CONSTRUCTION MACHINE

(75) Inventor: Hirofumi Wada, Shimotsuke (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 233 days.

(21) Appl. No.: 13/055,419

(22) PCT Filed: Feb. 26, 2010

(86) PCT No.: PCT/JP2010/053084
§ 371 (c)(1),
(2), (4) Date: Jan. 21, 2011

(87) PCT Pub. No.: WO2010/101085
PCT Pub. Date: Sep. 10, 2010

(65) Prior Publication Data
US 2011/0127819 A1    Jun. 2, 2011

(30) Foreign Application Priority Data
Mar. 4, 2009    (JP) ................................. 2009-050645

(51) Int. Cl.
*A47C 1/00* (2006.01)
*B60K 26/00* (2006.01)

(52) U.S. Cl.
USPC .................... 297/344.1; 297/411.35; 180/329

(58) Field of Classification Search
USPC .................. 297/344.1, 411.35; 180/329, 330, 180/331
See application file for complete search history.

(56) References Cited

U.S. PATENT DOCUMENTS

| | | | | |
|---|---|---|---|---|
| 4,478,308 A | * | 10/1984 | Klaassen | 180/326 |
| 5,086,869 A | * | 2/1992 | Newbery et al. | 180/329 |
| 6,450,284 B1 | * | 9/2002 | Sakyo et al. | 180/329 |
| 7,290,635 B2 | * | 11/2007 | Bisick et al. | 180/272 |
| 7,757,806 B2 | * | 7/2010 | Bower | 180/326 |
| 2005/0073184 A1 | | 4/2005 | Tsuji et al. | |
| 2008/0252114 A1 | * | 10/2008 | Kim | 297/216.15 |

FOREIGN PATENT DOCUMENTS

| | | |
|---|---|---|
| JP | S62-026466 U | 2/1987 |
| JP | H02-074226 U | 6/1990 |
| JP | H03-050225 U | 5/1991 |
| JP | H06-082160 U | 11/1994 |
| JP | H11-21949 A | 1/1999 |
| JP | 2004-116048 A | 4/2004 |
| JP | 2004-345587 A | 12/2004 |
| JP | 2005-96476 A | 4/2005 |
| JP | 2007-38744 A | 2/2007 |
| JP | 2007-154444 A | 6/2007 |
| JP | 2007-326469 A | 12/2007 |
| JP | 2008-265741 A | 11/2008 |

OTHER PUBLICATIONS

Notice of Reason(s) for Rejection dated Jan. 15, 2013 in corresponding Japanese Patent Application No. JP2011-502733, including English translation, 4 pages.

* cited by examiner

*Primary Examiner* — Sarah B McPartlin
(74) *Attorney, Agent, or Firm* — Fish & Richardson P.C.

(57) ABSTRACT

A seat structure for an operator that is set in a cab of a construction machine such as a wheel loader includes: a suspension equipment fixed to a floor frame; a plate-shaped attachment bracket attached on the suspension equipment; a seat and a work equipment console juxtaposed to each other on the attachment bracket. The seat is attached to the attachment bracket via slide rails in a manner slidable back and forth. The work equipment console is also attached to the attachment bracket via a slide rail in a manner slidable back and forth.

8 Claims, 5 Drawing Sheets

US 8,465,094 B2

OPERATOR SEAT STRUCTURE OF CONSTRUCTION MACHINE

CROSS REFERENCE TO RELATED APPLICATIONS

This application claims priority to Application No. PCT/JP2010/053084 filed on Feb. 26, 2010, which application claims priority to Application No. JP 2009-050645 filed on Mar. 4, 2009. The entire contents of both applications are incorporated herein by reference in their entireties.

TECHNICAL FIELD

The present invention relates to a seat structure for an operator of a construction machine such as a wheel loader.

BACKGROUND ART

A typical seat for an operator is slidable in a front-back direction in a cab of a construction machine such as a wheel loader. A work equipment console with a work equipment lever is also provided on a lateral side of the seat in the cab. As such a work equipment console, there has been known a work equipment console that erects on a floor frame of the cab in a manner slidable back and forth via a slide rail (for instance, see Patent Literature 1).

In the work equipment console with this arrangement, when a seat is slid for physical constitution of an operator, the work equipment console is also moved along the slide rail, so that it is always possible to adjust the seat and the work equipment console in a manner adjustable for the operator, so that a favorable workability can be provided.

Citation List

Patent Literature

Patent Literature 1 JP-A-2007-154444

SUMMARY OF THE INVENTION

Problems to Be Solved by the Invention

In the cab described in the Patent Literature 1, since the seat and the work equipment console are completely independently provided on the floor frame, a swinging degree of the operator sitting on the seat during operation is completely different from that of the work equipment console, resulting in insufficient operability of the work equipment lever.

In addition to the above arrangement, there has been also known an arrangement in which the work equipment console is attached to a frame of the seat. However, since this arrangement involves a limitation in increasing a frame rigidity of the seat, attachment strength of the work equipment console to the seat is likely to be insufficient. Accordingly, the work equipment console is affected by the shakiness of the seat, which may result in instability with larger shakiness; the operability problem cannot be solved.

An object of the invention is to provide a seat structure for an operator of a construction machine, the seat structure being capable of reliably improving operability of a work equipment lever and the like.

Means for Solving the Problems

A seat structure for an operator of a construction machine according to an aspect of the invention includes: a suspension equipment fixed to a floor frame; an attachment bracket attached onto the suspension equipment; and a seat and a work equipment console juxtaposed to each other on the attachment bracket, in which the work equipment console is attached to the attachment bracket via a slide rail, and the seat is attached to the attachment bracket via slide rails.

A seat structure for an operator of a construction machine according to another aspect of the invention includes: a suspension equipment fixed to a floor frame; an attachment bracket attached onto the suspension equipment; and a seat and a work equipment console juxtaposed to each other on the attachment bracket, in which the work equipment console is attached to the attachment bracket via a slide rail, and the attachment bracket is attached to the suspension equipment via slide rails.

In the seat structure according to the above aspect of the invention, it is preferable that the work equipment console is provided with a guide bar in parallel with the slide rail, the guide bar being slidably inserted into a slider, the slider being supported by the attachment bracket via a support bracket.

With this arrangement, since both the seat and the work equipment console are attached to the suspension equipment via a common attachment bracket, the seat and the work equipment console can be kept from individually shaking to improve operability of the work equipment lever and the like. Unlike a typical work equipment console being attached to a frame of a seat, the work equipment console and the seat are attached to the dedicated attachment bracket capable of supporting not only the work equipment console but also the seat. Accordingly, significant attachment strength of the work equipment console can be ensured.

The work equipment console is slidable via the slide rail, which enables to slide the work equipment console for physical constitution and the like of the operator, resulting in further improvement in operability of the work equipment lever and the like.

When the seat is attached to the attachment bracket via the slide rails, not only is the seat slidable but also the work equipment console is not influenced by the shakiness generated on the slide rails, thereby realizing more stable attachment of the work equipment console.

When the work equipment console is supported not only by the slide rail but also through the guide bar and the support bracket, the attachment strength of the work equipment console to the attachment bracket can be further improved. Moreover, for instance, when the work equipment console is arranged to be slidable by the slide rail, the work equipment console can move smoothly without shakiness.

DESCRIPTION OF EXEMPLARY EMBODIMENTS

First Exemplary Embodiment

A first exemplary embodiment of the invention will be described below with reference to the attached drawings.

Figure 1:
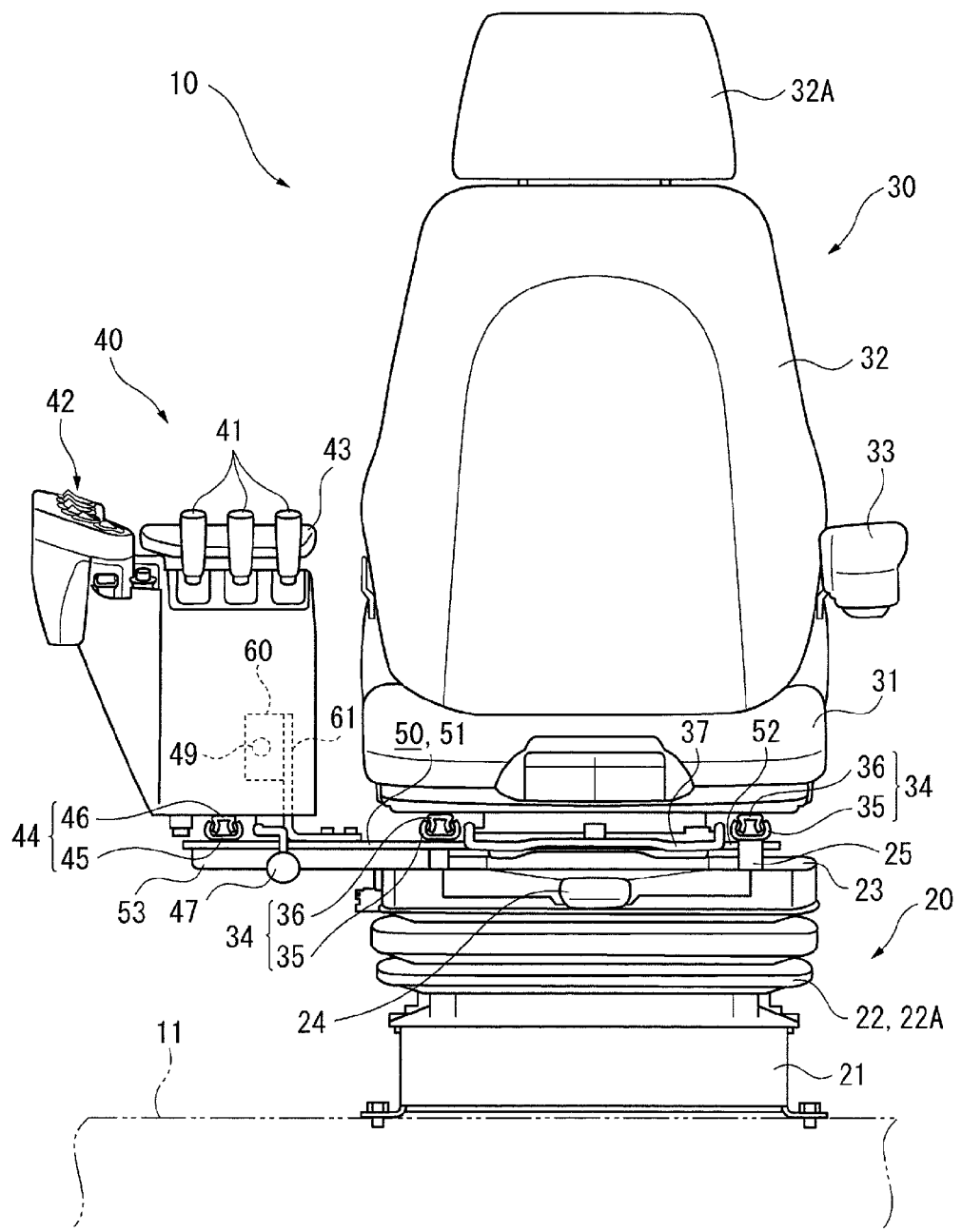
FIG. 1 is a front view of a seat structure according to a first exemplary embodiment of the invention.
Figure 2:
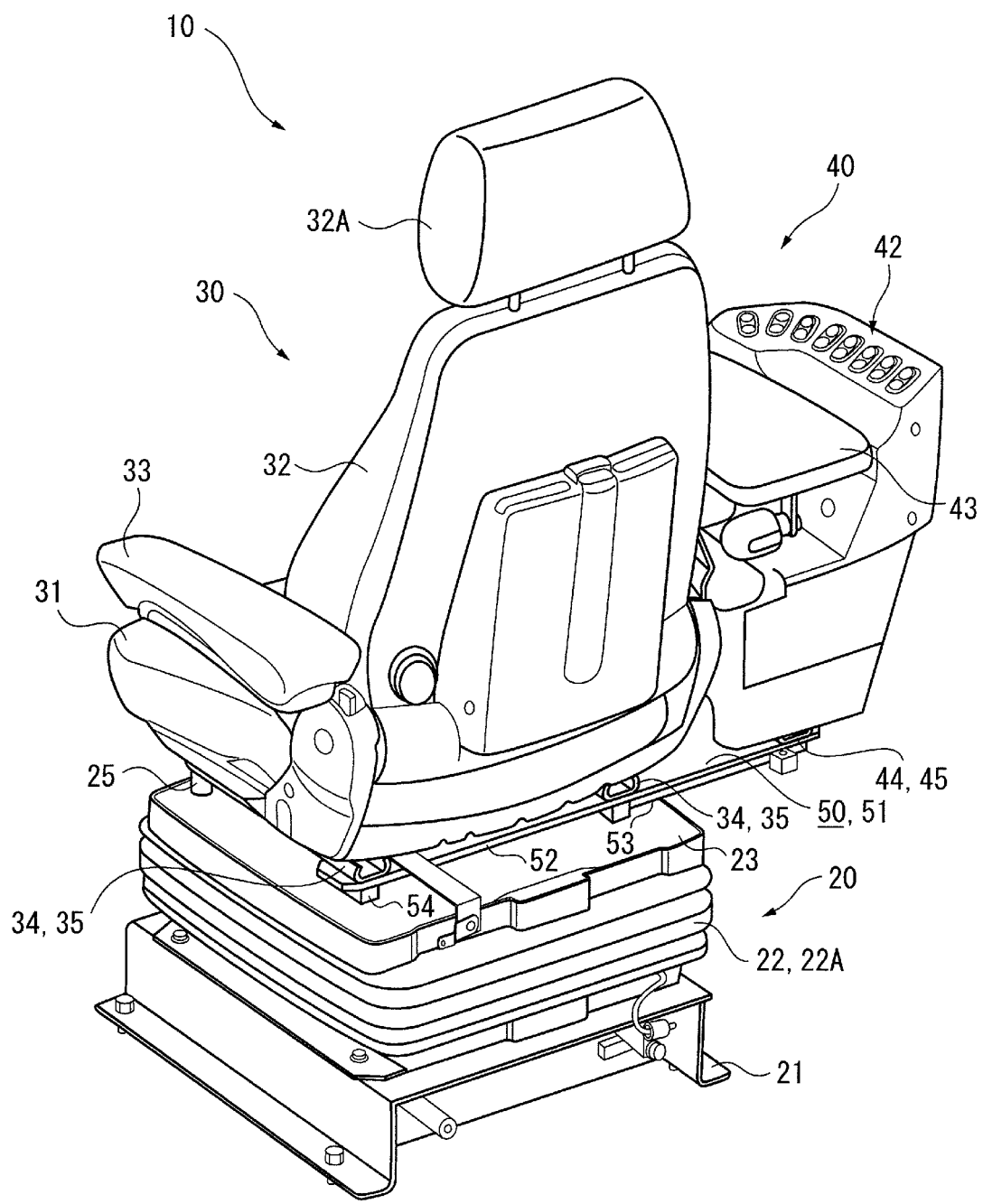
FIG. 2 is a perspective view of the seat structure seen from a back side.
Figure 3:
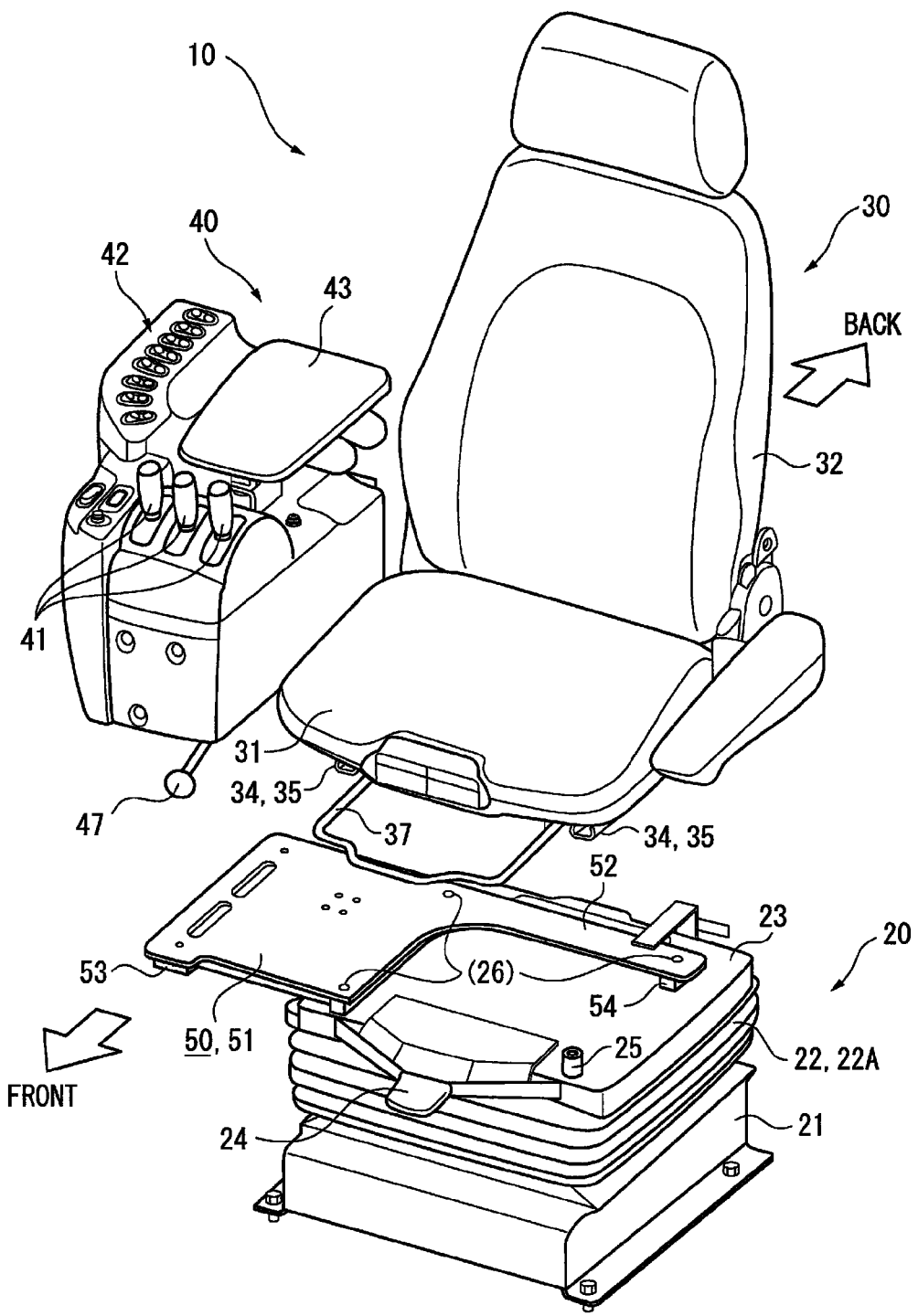
FIG. 3 is an exploded perspective view of the seat structure.

FIG. 1 is a front view of a seat structure 10 according to the first exemplary embodiment. FIG. 2 is a perspective view of the seat structure 10 seen from a back side. FIG. 3 is an exploded perspective view of the seat structure 10. The seat structure 10 is disposed in a cab (not shown) provided in a construction machine such as a wheel loader. The seat structure 10 includes: a suspension equipment 20 fixed on a floor frame 11 of the cab; a seat 30 for an operator; and a work equipment console 40, the seat 30 and the work equipment console 40 being disposed on the suspension equipment 20. The construction machine is not limited to the wheel loader, but may be a bulldozer or a hydraulic excavator.

The suspension equipment 20 includes: a steel-plate base frame 21 fixed to the floor frame 11 by a bolt or the like; and an equipment body 22 attached on the base frame 21. The equipment body 22 is entirely covered by bellows 22A made of synthetic rubber. The bellows 22A includes therein: a link mechanism (not shown) vertically extensible from the base frame 21 (a base end); an attachment board 23 attached to an upper part of the link mechanism; and a hydraulic damper upwardly urging and supporting the attachment board 23 and absorbing and damping vertical vibration. The attachment board 23 is provided with a height adjustment lever 24 for adjusting a height of the seat 30 by regulating and releasing extension of the link mechanism.

The seat 30 includes: a seat surface 31; a backrest 32; and a first armrest 22. The backrest 32 is provided with a headrest 32A. A pair of slide rails 34 is attached to a lower surface of the seat surface 31. The slide rails 34 each are provided by coupling an outer member 34 with an inner member 36 slidably along a longitudinal direction via a steel ball. For instance, the outer member 35 is fixed to the attachment board 23 or a later-described attachment bracket 50 and the inner member 36 is attached to the seat surface 31. The seat surface 31 is also provided with a front-back position adjustment lever 37 for regulating and releasing a movement of the seat 30 on the slide rails 34. The backrest 32 is tiltable relative to the seat surface 31 by a reclining mechanism.

The work equipment console 40 is disposed on a right side of the seat 30 (in this exemplary embodiment, front, back, left and right positions are defined in relation to an operator sitting on the seat) and includes a plurality of work equipment levers 41 and switches 42. The work equipment lever 41 is used for operating a bucket and a lift arm (a work equipment). The work equipment lever 41 erects from a front side of the work equipment console 40. A second armrest 43 is provided on a back side of the work equipment lever 41. With an elbow being put on the armrest 43, the work equipment lever 41 is operable.

The switches 42 are disposed outside the work equipment lever 41 and the armrest 43. The switches 42 includes: a start-key switch of an engine; a shift-mode switch for switching operational modes; a T/M cut-off switch; and other switches such as a switch relating to the work equipment, a switch relating to travel system and a switch relating to maintenance. The work equipment console 40 accommodates therein: a potentiometer outputting a command signal in accordance with an operational amount of the work equipment lever 41; and electrical circuit parts connected to the switches. The work equipment console 40 is attached on the attachment board 23 of the suspension equipment via the plate-shaped attachment bracket 50.

Specifically, as shown in FIG. 3, the attachment bracket 50 is bolted to attachment portions 26 at three corners except a stud 25 at a front-left corner among four corners of the flat-square attachment board 23. The above-described outer members 35 of the slide rails 34 of the seat 30 are positioned in a front-back direction at the stud 25 and the attachment portions 26. The outer members 35 are set on the attachment bracket 50 at the attachment portions 26 and are bolted together with the attachment bracket 50.

Specifically, the attachment bracket 50 is configured to include: a console setting portion 51 shaped in a flat square that is fixed to two attachment portions 26 on the right of the attachment board 23 and extends outward from the attachment portions 26; and an arm 52 that extends leftward from a back side of the console setting portion 51 and is fixed to the attachment portion 26 on the back-left. Accordingly, the attachment bracket 50 is not present in front of the arm 52, whereby the attachment bracket 50 is light-weighted to decrease loads on springs at the suspension equipment 20. Backup members 53 and 54 for reinforcement are provided over an entire lower surface of the console setting portion 51 and a lower surface of the arm 52 corresponding to the attachment portion 26 at an end of the arm 52.

A slide rail 44 is attached to the lower surface of the work equipment console 40. Similarly to the slide rails 34, the slide rail 44 is provided by coupling an outer member 45 with an inner member 46 in a manner slidable via a ball. The outer member 45 is fixed on the console setting portion 51 and the inner member 46 is fixed to a lower surface of the work equipment console 40. A front-back position adjustment lever 47 for adjusting front and back positions of the work equipment console 40 relative to the attachment bracket 50 is provided on the lower surface of the work equipment console 40.

Figure 4:
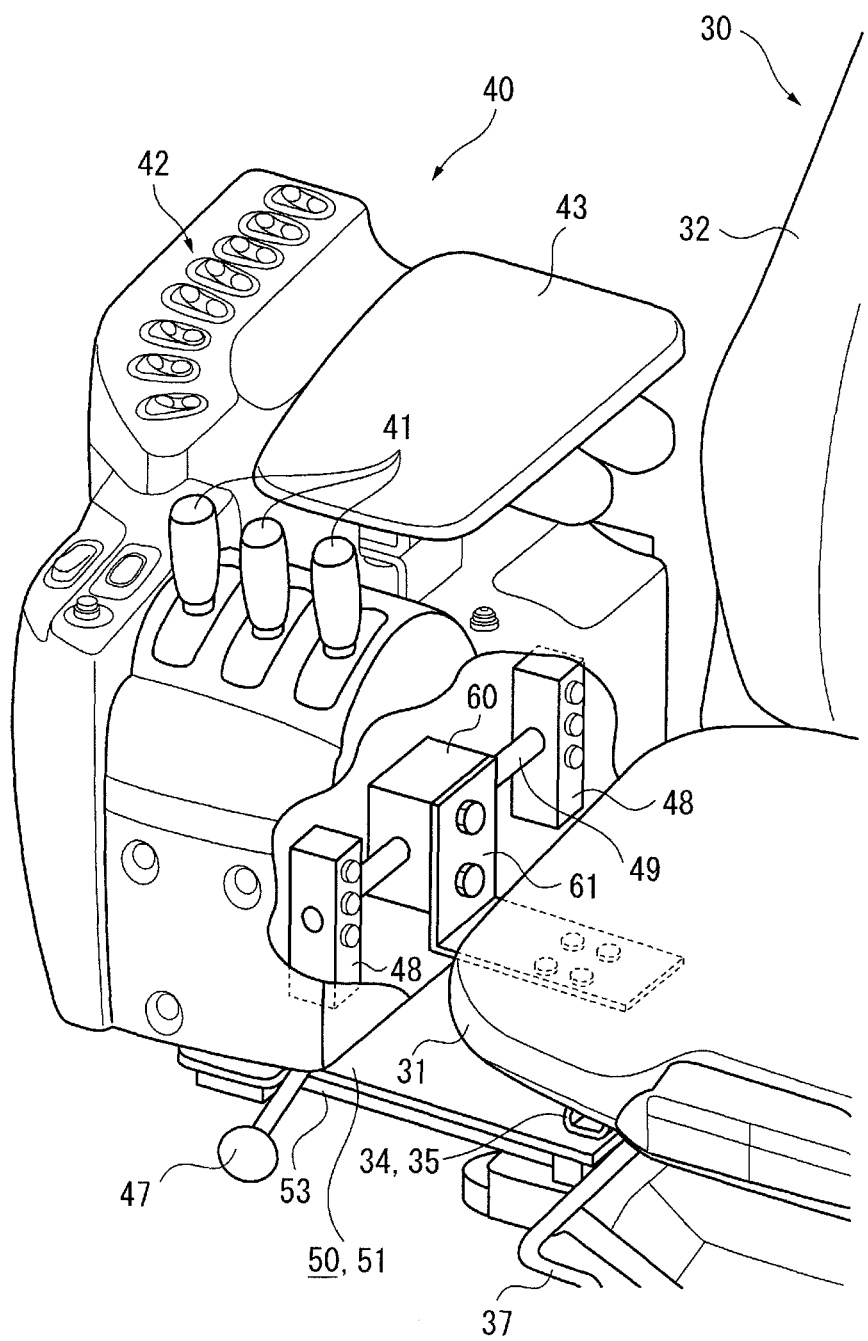
FIG. 4 is an enlarged view of a primary part of the seat structure.

In addition, as shown in an enlarged manner in FIG. 4, a pair of front and back blocks 48 is provided in the work equipment console 40. A guide bar 49 bridges the blocks 48 in parallel with the slide rail 44. A slider 60 is inserted into the guide bar 49 slidably back and forth. The slider 60 is attached to a first part of an L-shaped support bracket 61, a second part of the support bracket 61 being fixed on the console setting portion 51. In other words, the work equipment console 40 is slid back and forth on the slide rail 44 while being supported by the support bracket 61, whereby the work equipment console 40 is kept from shaking in sliding and is reliably attached to the attachment bracket 50.

As described above, in this exemplary embodiment, the work equipment console 40 is provided on the suspension equipment 20 together with the seat 30 via the attachment bracket 50. Accordingly, the work equipment console 40 also moves vertically in accordance with the vertical movement of the seat 30, thereby eliminating shakiness of the work equipment console 40 relative to the seat 30 to improve the operability of the work equipment lever 41 and the like.

Moreover, since the work equipment console 40 is not directly attached to the seat 30 but is attached to the attachment bracket 50 having a sufficient rigidity, attachment strength of the work equipment console 40 is reliably ensured to improve resistance to shakiness and oscillation.

Furthermore, since the work equipment console 40 is slid completely independently from the movement of the seat 30 by the slide rails 34, the work equipment console 40 is not influenced by the shakiness of the slide rails 34 and can be kept attached with less shakiness.

Since the work equipment console 40 is supported not only by the slide rail 44 but also by the support bracket 61 via the guide bar 49 and the slider 60, the work equipment console 40 can be more reliably attached to the attachment bracket 50 and be stably slid back and forth.

Second Exemplary Embodiment

Figure 5:
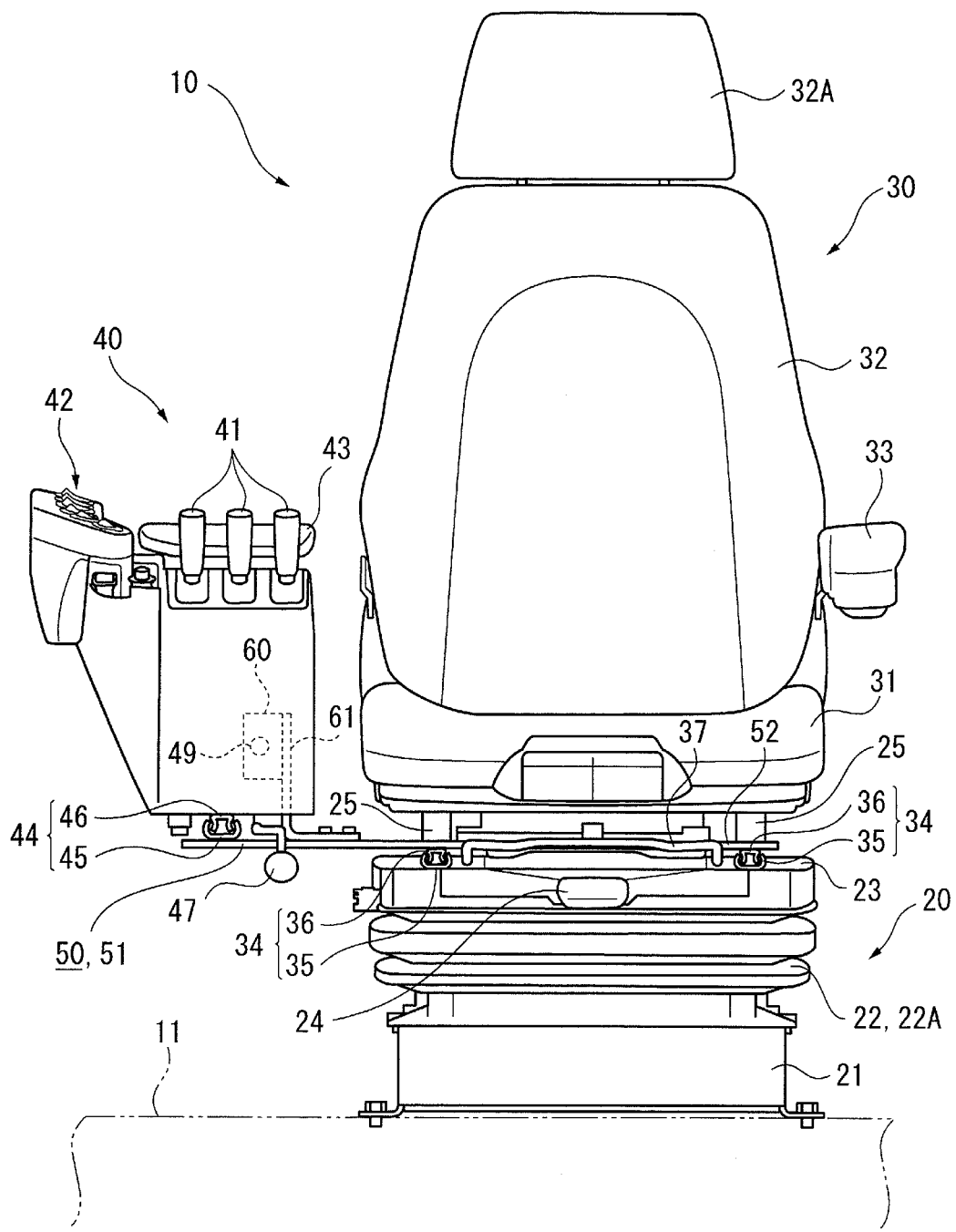
FIG. 5 is a front view of a seat structure according to a second exemplary embodiment of the invention.

FIG. 5 is the seat structure 10 according to a second exemplary embodiment of the invention. In this exemplary embodiment, an entirety of the attachment bracket 50 is provided in a square shape and the seat 30 is directly fixed on the attachment bracket 50, not through the slide rails 34. In other words, the slide rails 34 are interposed between the attachment bracket 50 and the attachment board 23 of the suspension equipment 20, whereby the seat 30 and the work equipment console 40 together with the attachment bracket 50 are slid back and forth.

In this exemplary embodiment, since sliding of the attachment bracket 50 leads to simultaneous sliding of the seat 30 and the work equipment console 40, an additional step of individually sliding the seat 30 and the work equipment console 40 for physical constitution of an operator can be avoided. Moreover, by sliding the work equipment console 40 with use of the slide rail 44, the front and back positions of the work equipment console 40 can be finely adjusted.

Although the best arrangement and method for implementing the invention has been disclosed above, the invention is not limited thereto. In other words, while the invention has been particularly explained and illustrated mainly in relation to a specific embodiment, a person skilled in the art could make various modifications in terms of shape, quantity or other particulars to the above described embodiment without deviating from the technical idea or any object of the present invention.

Therefore, the description that limits the shape and the material is only an example to make the invention easily understood, but is not intended to limit the invention, so that the invention includes the description using a name of component without a part of or all of the limitation on the shape and the material etc.

In the above exemplary embodiments, the work equipment console 40 is supported by the attachment bracket 50 via the slide rail 44 and the guide bar 49. However, the slide rail 44 and the guide bar 49 may be provided as needed. The invention also includes a case where the work equipment console 40 is directly fixed on the attachment bracket 50 and the attachment bracket 50 is directly fixed on the suspension equipment 20.

The invention claimed is:

1. A seat structure for an operator of a construction machine, the seat structure comprising:
    a suspension equipment fixed to a floor frame;
    an attachment bracket attached onto the suspension equipment; and
    a seat and a work equipment console juxtaposed to each other on the attachment bracket, wherein
    a lower surface of the work equipment console is attached to the attachment bracket via a first slide rail at a first position,
    the seat is attached to the attachment bracket via a second slide rail,
    the work equipment console is provided with a guide bar that is parallel to the first slide rail and that is configured to be slidably inserted into a slider, the slider being attached to the attachment bracket via a support bracket, and
    the work equipment console is attached to the attachment bracket via the support bracket at a second position different from the first position.

2. The seat structure for an operator of a construction machine according to claim 1, wherein the attachment bracket comprises:
    a console setting portion that is rectangular in shape, the console setting portion being configured to be placed under the work equipment console to support the work equipment console thereon; and
    an arm extending laterally from a back side of the console setting portion toward the seat, the arm being narrower in a front-back direction than the console setting portion.

3. The seat structure for an operator of a construction machine according to claim 1, wherein the guide bar is attached to the work equipment console via a pair of front and back blocks provided in the work equipment console, the guide bar bridging the pair of front and back portions.

4. The seat structure for an operator of a construction machine according to claim 1, wherein the support bracket is separate from the first slide rail.

5. A seat structure for an operator of a construction machine, the seat structure comprising:
    a suspension equipment fixed to a floor frame;
    an attachment bracket attached onto the suspension equipment; and
    a seat and a work equipment console juxtaposed to each other on the attachment bracket, wherein
    a lower surface of the work equipment console is attached to the attachment bracket via a first slide rail at a first position,
    the attachment bracket is attached to the suspension equipment via a second side rail,
    the work equipment console is provided with a guide bar that is parallel to the first slide rail and that is configured to be slidably inserted into a slider, the slider being attached to the attachment bracket via a support bracket, and
    the work equipment console is attached to the attachment bracket via the support bracket at a second position different from the first position.

6. The seat structure for an operator of a construction machine according to claim 5, wherein the attachment bracket comprises:
    a console setting portion that is rectangular in shape, the console setting portion being configured to be placed under the work equipment console to support the work equipment console thereon; and
    an arm extending laterally from a back side of the console setting portion toward the seat, the arm being narrower in a front-back direction than the console setting portion.

7. The seat structure for an operator of a construction machine according to claim 5, wherein the guide bar is attached to the work equipment console via a pair of front and back blocks provided in the work equipment console, the guide bar bridging the pair of front and back portions.

8. The seat structure for an operator of a construction machine according to claim 5, wherein the support bracket is separate from the first slide rail.

* * * * *